July 26, 1949.　　　　　G. W. SMITH　　　　　2,477,315
EXPANSIBLE PIPE FITTING
Filed July 25, 1947　　　　　　　　　　　　2 Sheets-Sheet 1

INVENTOR.
George W. Smith
BY
Harold F. Scribner

July 26, 1949.  G. W. SMITH  2,477,315
EXPANSIBLE PIPE FITTING
Filed July 25, 1947  2 Sheets-Sheet 2

INVENTOR
George W. Smith
BY
Harold F. Scribner
ATTORNEY

Patented July 26, 1949

2,477,315

UNITED STATES PATENT OFFICE 2,477,315

EXPANSIBLE PIPE FITTING

George W. Smith, Union, N. J.

Application July 25, 1947, Serial No. 763,553

4 Claims. (Cl. 285—205)

The present invention relates to air ducts and fittings such as are employed in the construction of air conditioning and heating systems and is concerned more particularly with improvements in the individual parts and component elements. The invention has for a primary objective a simplified and improved construction of various fittings whereby and wherewith the fitting is readily adaptable to meet a particular condition encountered in any given installation. The invention further undertakes to render available a new design of fitting embodying the on-the-job fabricating characteristics above mentioned and which also embodies features operative, on the installation of the fitting, to effect a stream-lining of air flow through the various parts of the system.

Still a further aim of the invention is to render available a system of fitting fabrication that may be utilized in the construction of any of several distinct types of fittings, for example, as a 45° elbow, or a 90° elbow, a branch take off, a reducer or an enlarger, in either the trunk or the branch lines of the system.

Heretofore the customary practice has been to manufacture the various fittings as complete units, each in numerous sizes, and the journeyman tinsmith was obliged to install the fittings in the size and shape that those particular fittings were furnished by the manufacturer and jobber. In consequence, the tinsmith had to carry to the job a wide assortment of sizes and shapes of each kind of fitting and expect that among the range of sizes, one would be found to meet each of the particular conditions encountered at the point of installation. Attempts to modify or change the size of a completely prefabricated fitting was not very successfully undertaken and often impossible because of the various seams, beading and lock joints, etc., that must be cut into in order to improvise. Moreover, the prefabricated fittings in common use have heretofore been constructed as a complete unit, and it became necessary for the manufacturer to produce, and the dealer to carry in stock a large inventory of the many difference types, as well as sizes, of fittings. Also, the prefabricated fittings did not lend themselves adapted for nesting, and many are damaged in transit notwithstanding careful packaging and handling.

In accordance with this invention, the various fittings may be constructed or prefabricated in a manner affording a wide range of adjustment in length, width, and depth. Preferably the fittings are composed of at least two portions one of which may be regarded as the male portion and the other of which may be regarded as the female portion and in many cases the male and female parts may be nested together singly or groups permitting safer shipping and the saving of considerable space.

Moreover each fitting, embodying the principles of this invention, is inherently capable and adapted for alteration as to size in two directions so that a given fitting may be partially fabricated by the manufacturer and fabrication completed on-the-job to suit the condition needed. Although it is the customary practice to lay out on paper the sizes and courses of the various trunks, stacks and ducts together with their various fittings and branch connections, conditions are frequently encountered on installing that require a re-routing, or shifting, or change in location shape or size of a fitting that had not been anticipated. Considerable delay and extra work is necessary therefore in obtaining the proper fitting or improvising a poor substitute. On the other hand, fittings constructed in accordance with this invention, embodying as they do, substantial universal adjustability in size, and an equal degree of flexibility as to shape, together with adjustability as to the location of the point of connection or union of the different parts of the system, the various problems encountered at the time of making an installation, are quickly overcome.

In carrying forward the aims of this invention, it is now proposed to fabricate the various units in a plurality of sections. In most cases the number of sections per unit will total 4, each being characterized by at least two extensions (perimetrally disposed) one of which is fixed as to length and provided along its extreme edge preferably with the female portion of a joint or seam, and the other of which is a plane sheet whose extreme edge constitutes the male part of a seam or joint. In the case of corner sections, for example, all are similarly formed and interfit to form a parallelogram of a certain maximum size. Should it be desired to decrease the sectional area of the parallelogram, it is necessary only to trim down the male extension of complemental sections of the fitting, then assemble and secure the seams in a customary manner, as by using the "Pittsburg" type of sheet metal lock. As to certain fittings, such as the plenum chamber, two or more of the sides that form corner sections may be given an outward flare, which on assembling, forms a throat for an angle bend as at the juncture of a trunk line with the plenum chamber. To facilitate the trimming operation, the male extension of each section preferably is ruled or scored with numbered parallel lines which serve as guides to indicate how much to trim off to produce an assembled fitting of a preselected or a standard size.

The invention is carried out in a similar manner in respect to elbows, offsets, and take off fittings for it is proposed to construct each of the fittings of a plurality of sections, with male and female seam portions, preferably ruled as above indicated. By trimming the male portion of selected sections the required amount and then assembling and securing the seams, as with a conventional lock, the sectional area of any given fitting may be constructed on-the-job to suit requirements or the conditions encountered.

Additionally, this invention proposes further improvements in a sectionalized fitting whereby a take-off connection at any desired point along the trunk or duct may be made. Heretofore take-offs had to be made at the extreme end of a fabricated section but with the aid of this invention one or more parts of the improved fitting may be shifted longitudinally of complementing portions of the trunk or another fitting to suit special requirements and the seams then locked together. The uncovered portion of the assembly is blanked off by an extending tail piece on the take-off section, or by a separate piece, or by another take-off, as may be expedient in a given installation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 of the drawing illustrates portions of a representative air system having various fittings constructed in accordance with this invention.

Figure 1:
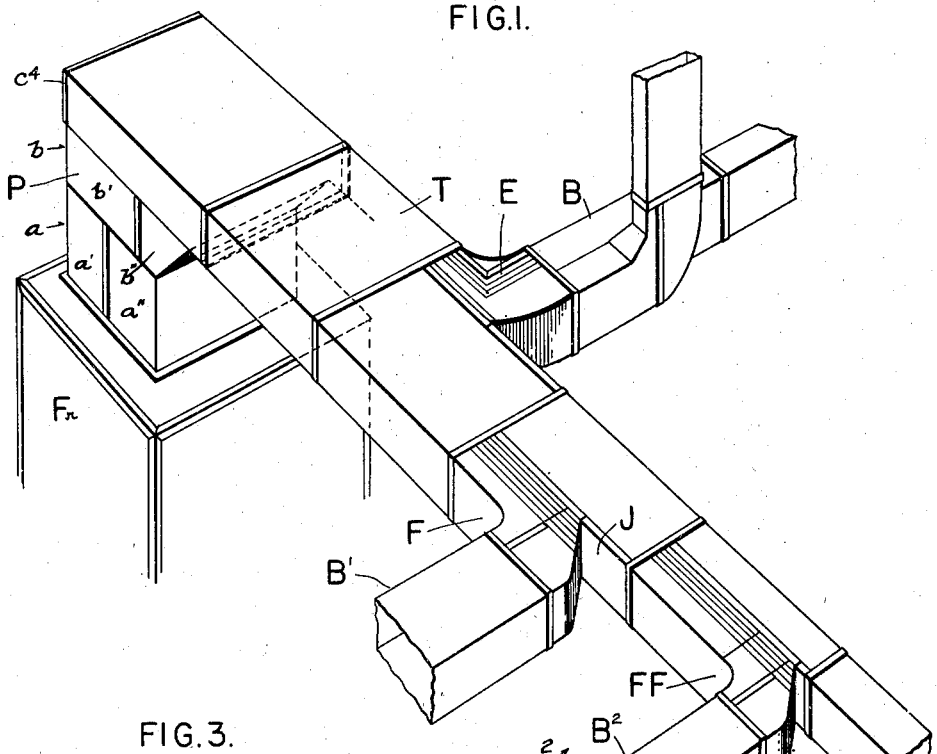

Referring more particularly to the representative system illustrated in Fig. 1, F' designates a warm air furnace embodying the conventional blower that forces heated air into a plenum chamber P; thence into a main trunk line T and branch lines B, B', B² leading to the various parts of a building.

Referring first to the plenum chamber P (see also Figs. 4 to 8), this fitting functions somewhat as a junction box, whereat one or more trunk lines are initially connected. The length and width of the plenum chamber varies with nearly every make of furnace, and its height varies in nearly every installation. In accordance with this invention, it is now proposed to fabricate such a unit in two tiers $a$ and $b$, and each tier being composed of a plurality of sections $a'$, $a''$, etc., $b'$, $b''$, etc., respectively. In this illustrative example, the sections $a'$, $a''$, etc., are shaped to form a square of a preselected maximum size, each being provided along its marginal edges with male and female joint portions 15 and 16. Where, as here illustrated the sections $a'$, $a''$, etc., are also corner sections, it is preferred to make the sides 17 and 18 unequal in length and to equip the shorter side 18 with the female portion of the joint. It will be understood that four of such sections are designed to interfit with one another to form a rectangular figure. In installations where the furnace opening is smaller than the area inscribed by the four interfitting sections, the male extension of opposed pairs of sections are trimmed off the required amount so that on assembling, the size of the chamber will be that required.

Figure 4:
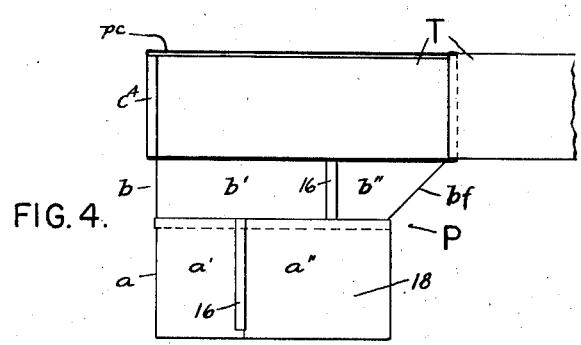
Figure 8:
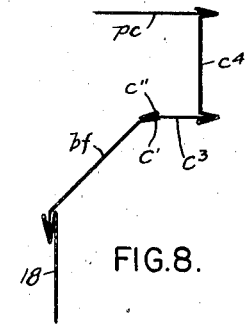
Fig. 8 is a line diagram of a preferred method of joining component elements of the fitting.

The second tier of sections $b$, $b'$, $b''$, etc., is similarly constructed with the exception that certain sections are fashioned with an outward flare, $bf$, on one or both of its extensions as desired. The upper marginal edges of the sections $b'$, $b''$ are fashioned with a shoulder bend $c'$ and an upstanding flange $c''$ adapted to fit within an opening cut in the under wall $c'''$ of a trunk section and hammered down over the margins of the interlocked sheet. Fig. 8 illustrates the seam only partially flattened. It will be understood however that all such seams are flattened tightly on completion of an assembly to insure firm union of the parts as well as to produce smooth surfaces inside and outside of the ducts. Fig. 4 illustrates a sectionalized plenum chamber of a size that fits a whole trunk section, whereas in Fig. 1 the plenum chamber is, for the purpose of illustration, shown as being shorter than a trunk section. The size of the plenum may, in accordance with this invention, be fitted to any size trunk merely by cutting into the under wall thereof, inserting and flattening down the extension flanges $c''$ of the respective sections $b'$, $b''$, etc. The end of a trunk line is closed in conventional manner by a side wall piece $c^4$ that is locked seamed about its margins to the walls of the trunk. The top $pc$ of the plenum chamber is, with this method of construction, the upper wall of a trunk, whereby eliminating the need of a specially constructed cap. The purpose of the flaring of the sections of the intermediate tier is to promote the flow of air from the plenum chamber into the trunk line or lines where they join the chamber. The outward flaring of the walls $bf$ forms a throat opening, as in an elbow, and avoids extreme eddying and dead air pockets at that junction point.

Figure 9:
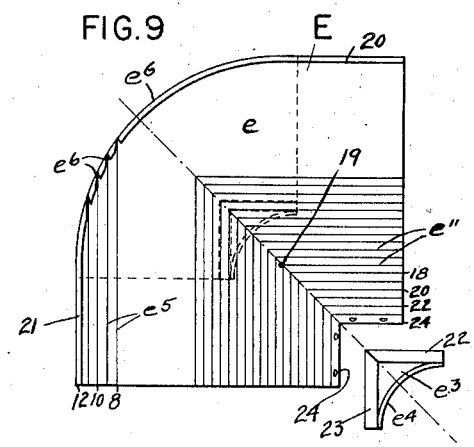
Fig. 9 is a plan view of one side of an elbow fitting.

In a similar way, elbows and bends (E in Figs. 1 and 9) are constructed. Fig. 9 illustrates one side of the elbow, in which the sheet $e$ has its outer edge or heel portion curved and fastened in a conventional way, to a flange piece $e'$. The center of a curvature lies well inside the margins of the sheet at the point indicated by a small circle 19 in Fig. 9. The throat portion of the sheet is cut in the form of a square, diagonal of which lies on a line intersecting the center of curvature of the heel portion and which line also bisects the angle formed by the extreme outer edges 20 and 21 of the sheet. A sheet so constructed is, it will be seen, adaptable for either right or left hand elbows. The throat zone of the sheet is preferably ruled two-ways, by a series of equally spaced parallel lines $e''$ which are numbered in sequence from the central portion toward the throat portion. The first line will for example be numbered 7, the next line 8, the next line 9, and so on, the number 7 indicating that the distance between that line and the outer edge is seven inches. The last line No.

24, indicates that the elbow may be 24 inches in width. These lines are provided to serve as a guide to the tinsmith to enable him quickly to trim the sheet to the required size of elbow needed. The throat piece e3, shown detached in Fig. 9, is thereafter inserted and completes the elbow. The throat piece is flanged at its side, and fashioned with a snap lock seam portion 22 and 23 that interlock with complemental indentations 24 made in the sheet e after it has been trimmed to size. Also the throat piece e3 is formed with a curved throat wall e4 whereby to improve the air flow around the corner. Fig. 9 illustrates in dotted lines, a typical location of the throat piece in constructing an elbow of a predetermined size smaller than the original sheet. The region of the sheet e adjacent one of the outer edges, e. g., 21 is also ruled with a series of parallel lines that extend to the outer seamed edge e6. Where the lines intersect the edge e6, the seam at that point is previously notched out so that the cutting away of the outer portion of the sheet, along one of the lines e5, requires merely the cutting of the plain sheet e, and not the difficult task of cutting through a corner seam. These lines e5, preferably are also numbered so as to indicate the extent of reduction to be made in the width of the elbow, whenever, for example, the latter is to be used in connection with a branch fitting on a trunk line. While the invention of an adjustable elbow fitting is disclosed in connection with a 90° elbow, the invention is also applicable to 45° elbows, as will be evident. It will also be understood that the opposite side wall of the elbow to be fabricated is constructed with perpendicular flanges as above explained, and the flanges of the two sheets secured together by throat and heel spacer sheets e7 and e8 respectively. The connecting sheets are connected to the flanges e4 and e', by conventional interlocking seams and may, of course, be trimmed to the width that is desired in constructing a bend of a certain depth and cross-sectional area or capacity.

Figures 10, 11:
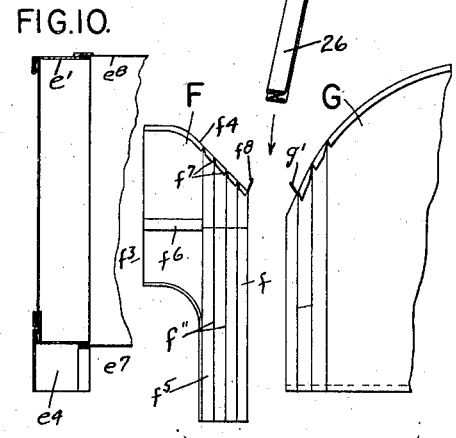
Fig. 10 is an end view thereof.
Fig. 11 is a partially assembled view of an adjustable take-off fitting together with an elbow such as illustrated in Figs. 9 and 10.

Fig. 11 illustrates the invention as applied to a branch take-off fitting F positioned on an elbow G.

The sides f of the take-off fitting F are ruled with parallel lines f' that extend lengthwise the fitting and which serve as a ready guide and capacity indicator. In duct work of this general character, a system of sizes has been developed and tables worked out whereby the tinsmith may determine how much a trunk line, or other conduit, should be reduced in width to compensate for a take-off of a given size. To reduce frictional losses it is preferable, where possible, to make the reduction (or enlargement as the case may be) in one direction only, for example in the width of the duct. The lines f' on the sides of the fitting F in Fig. 11, afford convenient-to-use indicators of the several capacities of a fitting so constructed. In assembling the fitting, the tinsmith trims off the excess stock and joins the cut edge to an adjacent section, illustrated at G, by means of a slip joint member 26 or other suitable seam making member. If desired, the cut edge on the fitting F may lap the surface of the adjacent fitting and secured as by riveting.

The open end $f^3$, of the take-off fitting F, is usually adapted for connection with an extending duct line (e. g. $B^2$ in Fig. 1) and where the capacity or width of the branch duct is predetermined, the fitting F may have its open end $f^3$ altered to suit. As indicated in Fig. 11, the heel portion $f^4$ of the fitting is a piece separate from the throat and tail portion $f^5$, but is normally locked thereto by a locking seam joint $f^6$. To close in the width of the open end of the fitting, the fitting is taken apart and the male extension portion of the parts trimmed off the amount required to produce an elbow take-off of a particular size. The sections are then assembled and the seams secured by a conventional lock or by soldering.

Figure 2:
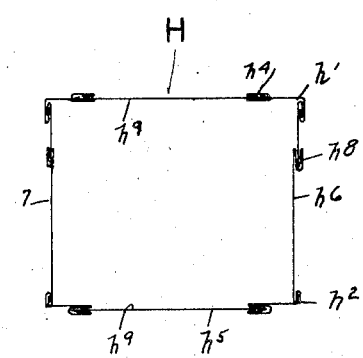
Fig. 2 is a transverse sectional view along line 2—2 of Fig. 1, of the two-way adjustable off-set fitting.
Figure 5:
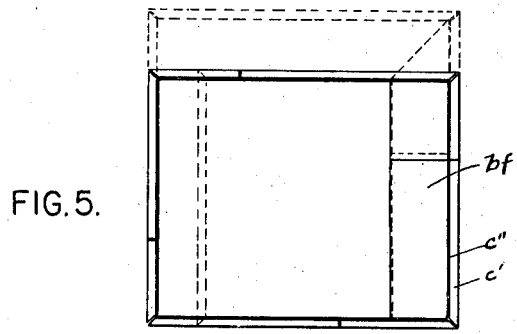
Figs. 4 and 5 are side and top views respectively of a plenum chamber constructed for adjustment in length, width, and height, and with and without a flaring for trunk connections.
Figures 6, 7:
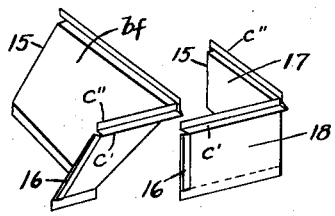
Figs. 6 and 7 are detail views of optional corner sections of the fitting.

The fittings F and G are also changeable in depth (in directions normal to the plane of the drawing) in a manner similar to that disclosed in connection with Figs. 2 and 10, as will be understood.

In the installing of fittings embodying the adjustability features of this invention, the workmen need cut across unseamed plane sheets only. Where cuts to be made intersect a corner seam, the corner seams are previously notched as illustrated at $e^6$ and $f^7$ in Figs. 9 and 11. Both sides of the fitting are trimmed to the notches in the corner seam, the perpendicular wall (e. g. e' in Fig. 10) is bent away from the rim and cut across from one side to the other. In general, however, the workmen will cut along a ruled line on the fitting of the next larger indicated size, and the extra inch (assuming 1 inch spacing of the lines) provides stock for the joint or seam.

Where it is found desirable or expedient to make a take-off in the middle of a standard length duct section, or nearer one end than the other, each adjustable take-off is constructed with an extending tail-piece, indicated at $f^5$ in Fig. 11 which may be easily trimmed down to the length required to bring the open end of the take-off at the desired point lengthwise the trunk. Fig. 1 illustrates an elbow adjacent the plenum end of a trunk section, a take-off F intermediate the ends of a trunk section, and a take-off FF positioned at the far end of a trunk section. Where desirable, two take-offs may be located in succession in the one trunk section and the trunk reduced proportionately. When a take-off is positioned below the transverse seam of a trunk section, the remaining open side of the trunk is covered by a piece J (Fig. 1) which overlays the folded back edge $f^8$ or $g^1$, in Fig. 11, and locked seamed along its edges with the side walls of the trunk.

Figure 3:
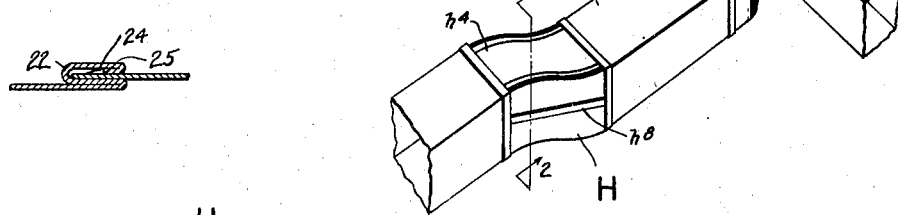
Fig. 3 is a detail sectional view of a lock seam.

In the drawings, referring more particularly to Fig. 1, the interfitting and locking seams are represented simply by double lines at the points where they occur, and inasmuch as this invention does not concern the seam per se but instead its location and disposition of the male and female portions on the respective sectionalized fittings, a more detailed illustration of the seam is deemed unnecessary. Any of the standard or conventional forms of locking seam may, of course, be used in practicing the invention. A preferred style of locking seam is illustrated in Fig. 3 and is known as the " "S" Slip lock." That type of lock joint comprises the crescent shaped indentations 24 spaced near and along the edge of the male extension of a sheet, and an inwardly tucked edge 25 of a doubly folded edge 22 of the female part of an adjacent section. As the portions are assembled, the indentations 24 move past and lock behind the inwardly folded edge 25 and the two sections of the fittings are united substantially as a contiguous member. Where two male extensions are to be joined a Z type clip, illustrated at 26 in Fig. 11 may be employed.

Figs. 1 and 2 illustrate the invention of an adjustable fitting applied to an off-set fitting H. Essentially this fitting is constructed of individual corner sections $h'$, $h^2$, similar to the sections of the plenum chamber P and elbow fitting E. The off-set, however, has its upper and lower walls $h^4$, $h^5$, shaped to raise or lower the plans of the duct the amount required to clear a girder, etc., in a building. The male and female extensions of the corner sections that form the side walls $h^6$ and $h^7$, are joined in this instance by a diagonally extending seam or lock joint $h^8$. In the example illustrated in Fig. 1, the side seam starts approximately central of the side wall at one end of the fitting and ends approximately central of the side wall of the other and offset end of the fitting. Accordingly, the male extension of the corner section may be trimmed along a line which at each end is equidistant from the upper (or lower) wall. When the two sections are assembled and the seam locked, the offset will be the same depth at each end. Variations in width of the offset are accomplished by interlocking a spacer sheet $h^9$ of the required width with the in-turned flanges of the corner sections. Inasmuch as the spacer sheet is cut from plane stock, little difficulty is had in curving the plans of the sheet to fit the curvature of the flanged portion of the corner sections.

From the foregoing it will be perceived that it is now possible to fabricate air ducts and fittings in such a manner that the workmen may cut and assemble the sections in the particular size required for the installation, and to effect the assembling with a minimum of time and effort. Moreover, fittings so made offer the least resistance to air flow, because of the large throat openings made possible by sectionalizing the different fittings. Additionally, fittings constructed in accordance with this invention are neat in appearance, sturdily seamed, and when in knocked down and nested condition, occupy considerably less space than the conventional fully prefabricated fittings.

Without further analysis, the foregoing will so fully reveal the gist of this invention that others can by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A partially prefabricated air duct fitting for use in heating and ventilating systems comprised of at least four sections adapted on being assembled to form a four sided air duct, each of said sections being composed of sheet like material bent medially of its side edges to form a corner piece, and each section having a female joint portion along one side edge and a complementing male joint portion along its other side edge, and each of said sections also having a female joint portion along one of its end edges and a male portion along the end edge opposite; said male joint portions of each section being comprised of the flat plane of the sheet and adapted for convenient trimming whereby a duct of a preselected length, width and depth may be completed and assembled on the job to suit flow area requirements.

2. A partially prefabricated elbow fitting for use in a heating or ventilating system comprising two sheet members having correspondingly curved edges, the axis of curvature lying within the margins of the sheets, and a wall member interlocked with said sheets along the curved outer edges whereby to form a U-shaped structure in any cross-sectional plane of the elbow, a separate throat piece for the elbow fitting comprising a curved member provided with upturned flanges along each side adapted to interlock with the inner edge portions of said first-mentioned members and to form therewith a curved throat to the elbow, the said inner portions of said first mentioned sheet members having flat plane edge portions adapted to be trimmed back as needed whereby the fabrication of an elbow fitting of a preselected sectional area at its entrance and exit ends may be completed on the site of use upon assembling said throat piece to the trimmed back portions of the U-shaped assembly.

3. A partially prefabricated fitting for heating and ventilating systems comprising a first assembly comprised of two sheet like members maintained in spaced apart relation by a connecting wall seamed thereto along its inner marginal edges, said connecting wall constituting a throat-like wall to the fitting, a second assembly comprised of a pair of sheet-like members maintained in spaced apart relation by a connecting wall member seamed thereto along its outer marginal edges, said last mentioned wall constituting part at least of the heel portion of an elbow fitting, one of said heel and throat assemblies having a female seam portion along its edges and the other of said assemblies having a male seam portion along its edges adapted for interfitting with the seam portions of the said other assembly to form a four sided elbow conduit, said male seam portions of the fitting being composed of the flat plane edge portions of the members and capable of being trimmed back as needed whereby the fabrication of an elbow fitting of a predetermined sectional area as to one of its flow openings may be completed on the site of use.

4. A partially prefabricated air duct for use in a heating or ventilating system comprising at least four sheet-like blanks, each of said blanks being bent medially of its side edges as to form a corner section capable of compact nesting with others, and each of said blanks being initially formed with a female seam portion along its left side edge and a male seam portion along the right side edge designed for interfitting with complementary seam portions of another adjacent section on assembling the four blanks together to form a four-sided conduit, the said male seam portion of each blank consisting of the plane unconfigured edge portion of the sheet and adapted for easy trimming on location to a narrower width whereby fabrication of a duct of a selected size as to depth and width may be completed on the site of use.

GEORGE W. SMITH.

REFERENCES CITED

The following references are of record in the file of this patent:

UNITED STATES PATENTS

| Number | Name | Date |
| --- | --- | --- |
| 872,332 | Dreier | Dec. 3, 1907 |
| 2,227,587 | Jones et al. | Jan. 7, 1941 |
| 2,275,572 | Somers | Mar. 10, 1942 |